(12) United States Patent
Kim et al.

(10) Patent No.: US 11,237,680 B2
(45) Date of Patent: Feb. 1, 2022

(54) FINGERPRINT RECOGNIZABLE TOUCH SENSOR AND DISPLAY DEVICE INCLUDING THE FINGERPRINT RECOGNIZABLE TOUCH SENSOR

(71) Applicant: SAMSUNG ELECTRONICS CO., LTD., Suwon-si (KR)

(72) Inventors: Hongsuk Kim, Seoul (KR); Dongkyun Kim, Suwon-si (KR); Seogwoo Hong, Yongin-si (KR); Jinmyoung Kim, Hwaseong-si (KR); Jinhee Nam, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/984,685

(22) Filed: Aug. 4, 2020

(65) Prior Publication Data
US 2021/0240302 A1 Aug. 5, 2021

(30) Foreign Application Priority Data
Feb. 4, 2020 (KR) .................. 10-2020-0013302

(51) Int. Cl.
*G06F 3/044* (2006.01)
*G06K 9/00* (2006.01)
*G06F 3/041* (2006.01)

(52) U.S. Cl.
CPC .......... *G06F 3/0445* (2019.05); *G06F 3/0412* (2013.01); *G06F 3/04164* (2019.05); *G06K 9/0002* (2013.01)

(58) Field of Classification Search
CPC .. H05K 1/113; H05K 1/147; H05K 2201/043; H05K 2201/09236; H05K 3/361; H05K 1/117; H05K 1/118; H05K 2201/09127; H05K 2201/09254; H05K 2201/09727; H05K 1/036; H05K 1/111; H05K 1/115; H05K 2201/0397;
(Continued)

(56) References Cited

U.S. PATENT DOCUMENTS 9,025,301 B1 5/2015 Adlam
2005/0046033 A1* 3/2005 Chung ................ H01L 23/4985
257/774
(Continued)

FOREIGN PATENT DOCUMENTS

KR 10-2017-0124491 A 11/2017
KR 10-2018-0102028 A 9/2018

*Primary Examiner* — Sanjiv D. Patel
(74) *Attorney, Agent, or Firm* — Sughrue Mion, PLLC

(57) ABSTRACT

A touch sensor may include: a touch panel including a plurality of electrodes and a plurality of electrode pads respectively connected to the plurality of electrodes; a bonding layer disposed on and in contact with the plurality of electrode pads; and a printed circuit board including: an insulating layer including a first surface adjacent to the bonding layer and a second surface facing the first surface; a plurality of first bonding pads provided in a first region of the first surface of the insulating layer; a plurality of second bonding pads disposed on the second surface of the insulating layer; and a plurality of extension pads disposed on a second region different from the first region of the first surface of the insulating layer and respectively connected to the plurality of second bonding pads.

15 Claims, 5 Drawing Sheets

(58) Field of Classification Search
CPC ...... G06F 3/04164; G06F 3/0412; G06F 1/16; G09G 2300/04; G09G 3/2092; H01L 2224/4824; H01L 2224/49175; H01L 2224/97; H01L 2224/48227; H01L 2224/48463; G02F 1/13452; G02F 1/1333; G02F 1/1309; G02F 1/13338; G02F 1/13458; G02F 1/136254

See application file for complete search history.

(56) References Cited

U.S. PATENT DOCUMENTS

| | | | |
|---|---|---|---|
| 2008/0251940 A1 | 10/2008 | Lee et al. | |
| 2016/0242295 A1* | 8/2016 | Kim | H05K 1/111 |
| 2017/0364726 A1 | 12/2017 | Buchan et al. | |
| 2019/0051668 A1* | 2/2019 | Huang | H01L 27/124 |
| 2019/0228204 A1 | 7/2019 | Park et al. | |
| 2020/0004090 A1* | 1/2020 | Yoshida | G02F 1/1339 |
| 2020/0294875 A1 | 9/2020 | Chung et al. | |

\* cited by examiner

FINGERPRINT RECOGNIZABLE TOUCH SENSOR AND DISPLAY DEVICE INCLUDING THE FINGERPRINT RECOGNIZABLE TOUCH SENSOR

CROSS-REFERENCE TO RELATED APPLICATION

This application claims priority from Korean Patent Application No. 10-2020-0013302, filed on Feb. 4, 2020 in the Korean Intellectual Property Office, the disclosure of which is incorporated herein by reference in its entirety.

BACKGROUND

1. Field

Apparatuses and methods consistent with example embodiments relate to a touch sensor having a fingerprint recognition function and a display device including the same.

2. Description of Related Art

A touch sensor is an input device that recognizes a location of a touched area or related information and transmits information about the location of the touched area to a system when a user touches the touch sensor with a finger etc. The touch sensor has advantages of being simple and convenient to use. A touch sensor may generally be of a resistive overlay type, an electromagnetic type, a capacitive overlay type, etc., depending on the method of sensing a touched portion. In particular, a touch sensor of a capacitive overlay type has the advantages of high transmittance, excellent durability, excellent touch resolution, and multi-touch capability. Touch sensors are applied to various electronic devices, such as automatic teller machines (ATMs), automatic ticket machines, and navigation devices, as well as mobile devices, such as smartphones and tablet personal computers (PCs).

A touch sensor generally includes a sensing unit for sensing a user's finger or the like and a printed circuit board for driving the sensing unit. The sensing unit may have a structure including a plurality of electrodes arranged to cross each other. Also, the sensing unit may include a plurality of traces extending from the plurality of electrodes and a plurality of electrode pads respectively electrically connected to the plurality of traces. The printed circuit board may include a chip that transmits a driving signal to the sensing unit, a plurality of traces extending from the chip, and a plurality of bonding pads respectively electrically connected to the plurality of traces. The plurality of electrode pads included in the sensing unit respectively contact the plurality of bonding pads included in the printed circuit board, and thus, the sensing unit and the printed circuit board may be electrically connected to each other.

In the related art, a pitch between the plurality of bonding pads included in the printed circuit board is in a range of about 100 μm to about 150 μm. When a pitch between the bonding pads is 100 μm or less, a short circuit may occur between the bonding pads and the electrode pads, thereby increasing a defect rate in a manufacturing process. Recently, the demand for touch sensors having a large area has rapidly increased. For a large area touch sensor, a pitch between the bonding pads should be reduced because, when an area of a touch sensor is increased, the required number of bonding pads increases, and a space where the bonding pads are provided is limited. Accordingly, there is a need for a printed circuit board including a bonding pad having a narrow pitch (fine pitch).

SUMMARY

Provided are fingerprint recognizable touch sensors including a printed circuit board including a bonding pad having a small pitch and a display device including the fingerprint recognizable touch sensors.

Additional aspects will be set forth in part in the description which follows and, in part, will be apparent from the description, or may be learned by practice of the presented embodiments of the disclosure.

According to an aspect of an example embodiment, there is provided a touch sensor including: a touch panel including a plurality of electrodes and a plurality of electrode pads respectively connected to the plurality of electrodes; a bonding layer disposed on and in contact with the plurality of electrode pads; and a printed circuit board including: an insulating layer including a first surface adjacent to the bonding layer and a second surface facing the first surface; a plurality of first bonding pads provided in a first region of the first surface of the insulating layer; a plurality of second bonding pads disposed on the second surface of the insulating layer; and a plurality of extension pads disposed on a second region different from the first region of the first surface of the insulating layer and respectively connected to the plurality of second bonding pads.

On a plan view of the printed circuit board, the plurality of first bonding pads and the plurality of second bonding pads may be alternately arranged in a first direction.

The first region and the second region may be separated from each other based on a center line that is parallel to the first direction on a surface of the insulating layer.

The plurality of first bonding pads and the plurality of extension pads may be arranged in a zigzag shape with respect to the center line.

On the plan view of the printed circuit board, the plurality of second bonding pads and the plurality of extension pads may be located on a same line in a second direction that is perpendicular to the first direction.

The plurality of second bonding pads may be included in all regions corresponding to the first region and the second region.

The insulating layer may include a plurality of vias that connect the plurality of second bonding pads in a one-to-one correspondence to the plurality of extension pads.

The plurality of vias may be disposed on an edge of the second region of the insulating layer.

The plurality of vias may be disposed on an edge separated from a boundary line where the first region and the second region contact each other with the plurality of extension pads therebetween.

The plurality of vias may be filled with a conductive material.

The plurality of electrode pads may be disposed on a same plane.

The plurality of electrode pads may be arranged to be parallel to each other in the first direction.

The plurality of electrode pads are arranged in a zigzag shape based on a center line that is parallel to the first direction.

On the plan view of the printed circuit board, a separation distance between the first bonding pads and the second bonding pads adjacent to each other is in a range of 15 μm to 35 μm.

The bonding layer may include an anisotropic conductive film layer.

The bonding layer may include a first bonding layer and a second bonding layer that are separated from each other, wherein the first bonding layer may be disposed between the plurality of first bonding pads and the plurality of electrode pads, and the second bonding layer may be disposed between the plurality of extension pads and the plurality of electrode pads.

The printed circuit board may include either one or both of a chip on film (COF) and a flexible printed circuit board (FPCB).

The plurality of electrodes and the plurality of electrode pads may be arranged on a substrate including at least one of glass and film.

The plurality of electrodes may include: a plurality of first electrodes extending in a first direction and arranged to be parallel to each other in a second direction perpendicular to the first direction; and a plurality of second electrodes extending in the second direction to cross the plurality of first electrodes and disposed to be parallel to each other in the first direction.

According to an aspect of another example embodiment, there is provided a display device including: the touch sensor; and a display panel disposed on a lower side of the touch panel.

BRIEF DESCRIPTION OF THE DRAWINGS

The above and/or other aspects will be more apparent by describing certain example embodiments, with reference to the accompanying drawings, in which.

DETAILED DESCRIPTION

Figure 1:
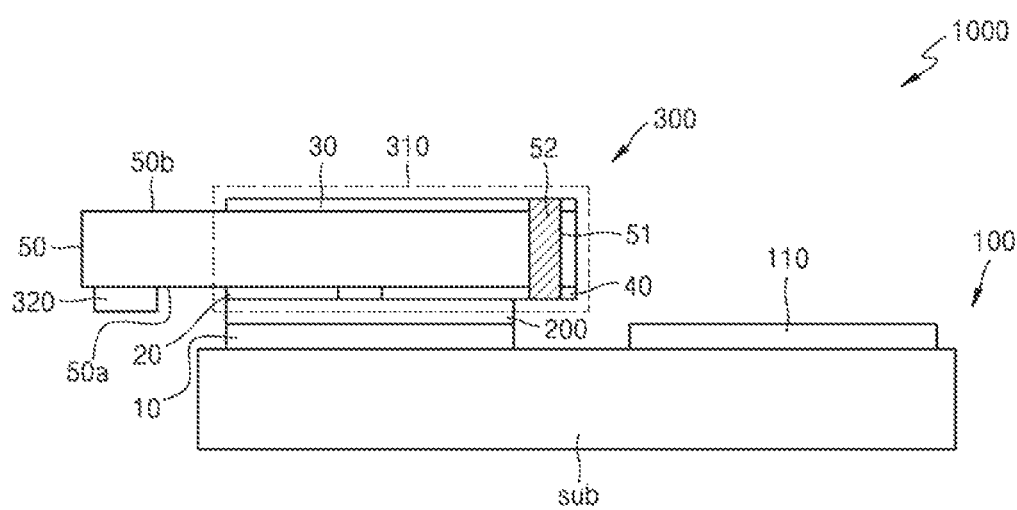
FIG. 1 is a lateral cross-sectional view showing a brief structure of a touch sensor according to an example embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, a fingerprint recognizable touch sensor and a display device including the fingerprint recognizable touch sensor according to various example embodiments will be described in detail with reference to the accompanying drawings. In the drawings, like reference numerals refer to like elements, and size or thickness of each constituting element may be exaggerated for clarity of descriptions.

It will be understood that, although the terms "first", "second", etc. may be used herein to describe various elements, the elements should not be limited by these terms. These terms are only used to distinguish one element from another element. A fingerprint recognizable touch sensor and a display device including the same may be implemented in various different forms and are not limited to the example embodiments described herein.

Figure 2:
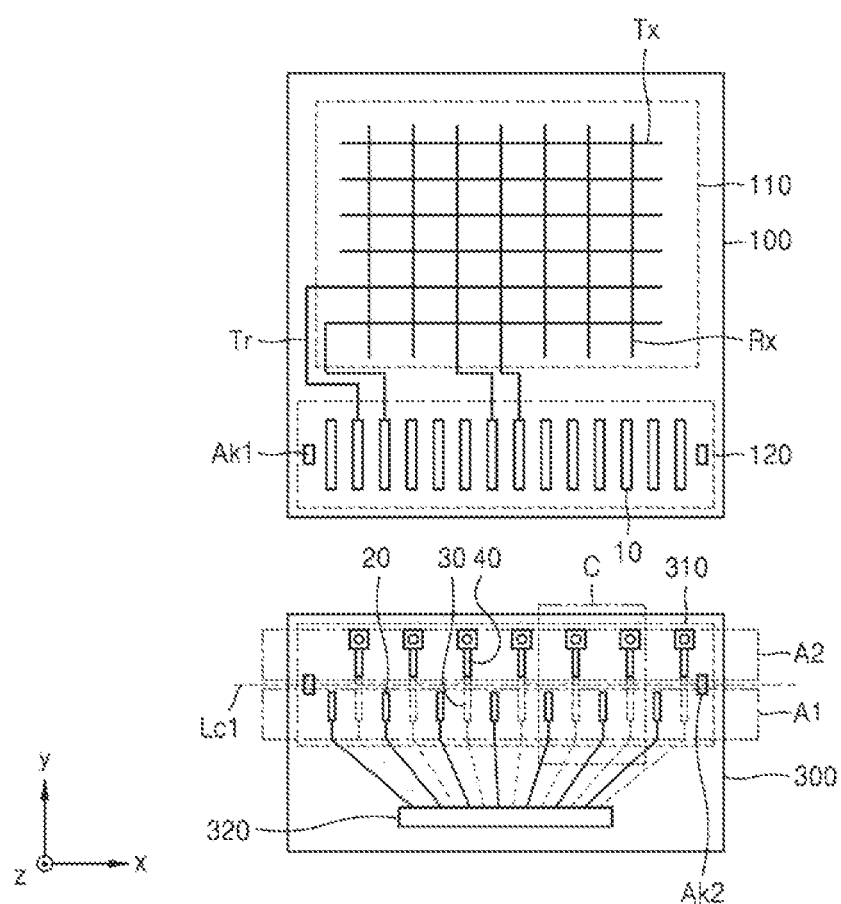
FIG. 2 is a plan view showing a brief structure of a touch panel and a printed circuit board included in the touch sensor according to an example embodiment of FIG. 1.

It should be understood that, when a part "comprises" or "includes" an element in the specification, unless otherwise defined, other elements are not excluded from the part and the part may further include other elements FIG. 1 is a lateral cross-sectional view showing a brief structure of a touch sensor 1000 according to an example embodiment. FIG. 2 is a plan view showing a brief structure of a touch panel 100 and a printed circuit board 300 included in the touch sensor 1000 of FIG. 1.

Referring to FIG. 1, the touch sensor 1000 may include the touch panel 100 including a structure in which a sensing unit 110 and a plurality of electrode pads 10 are provided on a substrate sub. Referring to FIG. 2, the sensing unit 110 may include a plurality of electrodes Tx and Rx. The plurality of electrode pads 10 may be electrically connected to the plurality of electrodes Tx and Rx. A region where the plurality of electrode pads 10 are formed may be referred to as an electrode pad unit 120. Also, the touch sensor 1000 may include a bonding layer 200 that is electrically connected to the plurality of electrode pads 10. For example, the bonding layer 200 may be formed to contact the plurality of electrode pads 10.

Furthermore, the touch sensor 1000 may include the printed circuit board 300 that is electrically connected to the touch panel 100 via the bonding layer 200. The printed circuit board 300 may include an insulating layer 50 including a first surface 50a adjacent to the bonding layer 200 and a second surface 50b facing the first surface 50a. The printed circuit board 300 may include a plurality of first bonding pads 20 provided in a first region A1 of the first surface 50a. The printed circuit board 300 may include a plurality of second bonding pads 30 provided on the second surface 50b. The printed circuit board 300 may include a plurality of extension pads 40 that are provided on a second region A2 different from the first region A1 of the first surface 50a and is connected to a plurality of second bonding pads 30. For example, the plurality of electrode pads 10 of the touch panel 100 and the first bonding pads 20 and the extension pads 40 of the printed circuit board 300 may be electrically connected via the bonding layer 200. For example, the first bonding pad 20 and the extension pad 40 may contact the other surface facing the surface of the bonding layer 200 contacting the plurality of electrode pads 10. Accordingly, the first bonding pad 20 and the extension pad 40 may be provided to be separated from the plurality of electrode pads 10 with the bonding layer 200 therebetween.

The touch panel 100 may include a sensing unit 110 that may sense a contact by a finger or an image of a fingerprint of a user etc. The sensing unit 110 may include a plurality of first electrodes Tx and a plurality of second electrodes Rx. As illustrated in FIG. 2, the plurality of first electrodes Tx and the plurality of second electrodes Rx may cross each other. For example, each of the plurality of first electrodes Tx may extend in a first direction (x-axis direction) and may be repeatedly arranged to be parallel to each other in a second direction (y-axis direction) crossing the first direction (x-axis direction). Also, each of the plurality of second electrodes Rx may extend in the second direction (y-axis direction) so as to intersect each of the plurality of first electrodes Tx and may be repeatedly arranged to be parallel to each other in the first direction (x-axis direction). As described above, since the plurality of first electrodes Tx and the plurality of second electrodes Rx cross each other, the sensing unit 110 may include a mesh shape.

The sensing unit 110 may sense a touch, for example, by a capacitance method. In this case, a change in self-capacitance or mutual capacitance is caused by a touch input or fingerprint input at nodes where the plurality of first electrodes Tx and the plurality of second electrodes Rx cross each other, and thus, it is possible to calculate coordinates of the touch input or an image of the touched fingerprint from the change in the capacitance in the plurality of touched nodes. Accordingly, nodes where the plurality of first electrodes Tx and the plurality of second electrodes Rx cross each other may function as pixels sensing a touch input or a fingerprint input.

For example, a voltage may be applied to the plurality of first electrodes Tx or the plurality of second electrodes Rx from the outside. In this case, intersections of the plurality of first electrodes Tx and the plurality of second electrodes Rx may have mutual capacitance. When a user touches the sensing unit 110 with a finger, a change in mutual capacitance may occur at intersections of the plurality of first electrodes Tx and the plurality of second electrodes Rx included in the touched region. Coordinates of a touch input by the user may be calculated by measuring a change in mutual capacitance in the sensing unit 110.

Also, the change in the mutual capacitance may be different in an electrode adjacent to a ridge and an electrode adjacent to a valley, the ridge and the valley is indicated by a fingerprint on a surface of the user's finger. A distance between the plurality of first electrodes Tx and the plurality of second electrodes Rx may be formed to be less than that of the finger's ridge and valley. Accordingly, a change in the mutual capacitance between the plurality of first electrodes Tx and the plurality of second electrodes Rx by a finger may be detected for each location, and as a result, a fingerprint image may be calculated.

The plurality of first electrodes Tx may be driving electrodes that receive a voltage from the outside. In this case, the plurality of second electrodes Rx may be sensing electrodes to which a measurement unit (e.g., a measurement circuit) capable of detecting a change in electric capacity is connected. However, the present example embodiment is not limited thereto, that is, the plurality of second electrodes Rx may be driving electrodes to which a voltage is applied from the outside, and the plurality of first electrodes Tx may be sensing electrodes to which a measuring unit capable of detecting a change in the electric capacity is connected.

Referring to FIG. 2, the touch panel 100 may include a plurality of traces Tr extending from the plurality of first electrodes Tx and the plurality of second electrodes Rx. The plurality of traces Tr may be conductive wirings. In other words, the plurality of traces Tr may include a conductive material. For example, the plurality of traces Tr may include a transparent conductive material, such as indium tin oxide (ITO). The touch panel 100 may include the electrode pad unit 120 having a plurality of electrode pads 10 connected to a plurality of first electrodes Tx and a plurality of second electrodes Rx. For example, the plurality of electrode pads 10 may be connected in one-to-one correspondence to the plurality of first electrodes Tx and the plurality of second electrodes Rx through the plurality of traces Tr. The plurality of electrode pads 10 may be arranged to be parallel to each other in the first direction (x-axis direction). Two alignment marks Ak1 may be provided in both ends of the electrode pad unit 120. For example, the two alignment marks Ak1 may be arranged to be separated from each other with the plurality of electrode pads 10 arranged to be parallel to each other in the first direction (x-axis direction) therebetween.

Referring to FIG. 1, the sensing unit 110 and the electrode pad unit 120 electrically connected to each other by a plurality of traces Tr may be provided on the substrate sub. In FIG. 1, for convenience of description, the trace Tr is omitted. The substrate sub may be transparent. The substrate sub may include an insulating material. For example, the substrate (sub) may include polyethylene terephthalate (PET), polycarbonate (PC), polymethyl methacrylate (PMMA), polyethylene naphthalate (PEN), polyethersulfone (PES), cyclic olefin polymer (COC), triacetylcellulose (TAC) film, polyvinyl alcohol (PVA) film, polyimide (PI) film, polystyrene (PS), biaxially oriented PS (BOPS), or glass. In this way, the substrate sub may include various materials, and accordingly, may have various elongation percentages.

The bonding layer 200 may be a connection layer that electrically connects the touch panel 100 and the printed circuit board 300 to each other. For example, the bonding layer 200 may include an anisotropic conductive film (ACF). The bonding layer 200 may be formed to contact the plurality of electrode pads 10, the plurality of bonding pads 20, and the plurality of extension pads 40.

The printed circuit board 300 may include a bonding pad unit 310 including the plurality of first bonding pads 20, the plurality of second bonding pads 30, and the plurality of extension pads 40 provided on the insulating layer 50 and a microchip 320.

The bonding pad unit 310 may be electrically connected to the electrode pad unit 120 of the touch panel 100. The microchip 320 may generate a driving signal for driving the sensing unit 110 of the touch panel 100. The microchip 320 may be electrically connected to the bonding pad unit 310. The driving signal from the microchip 320 may be transmitted to the bonding pad unit 310. The signal may be transmitted to the electrode pad unit 120 electrically connected to the bonding pad unit 310. The driving signal finally transmitted to the electrode pad unit 120 may be transmitted to the plurality of first electrodes Tx or the plurality of second electrodes Rx through the plurality of traces Tr. The printed circuit board 300 may include any one of a chip on film (COF) and a flexible printed circuit board (FPCB). However, the present example embodiment is not limited thereto, that is, the printed circuit board 300 may include any one of a tape carrier package (TCP) and a tape automated bonding (TAB).

Referring to FIG. 1, the bonding pad unit 310 may include the insulating layer 50. The insulating layer 50 may include a first surface 50a adjacent to the bonding layer 200 and a second surface 50b facing the first surface 50a. For example, the first surface 50a may be an upper surface of the insulating layer 50 and the second surface 50b may be a lower surface of the insulating layer 50. The plurality of first bonding pads 20 may be provided on the first surface 50a of the insulating layer 50. The plurality of second bonding pads 30 may be provided on the second surface 50b of the insulating layer 50. The insulating layer 50 may include polyimide (PI). However, the present example embodiment is not limited thereto, that is, the insulating layer 50 may include other insulating materials other than polyimide (PI). The insulating layer 50 may be provided between the plurality of first bonding pads 20 and the plurality of second bonding pads 30 to insulate the first and second bonding pads 20 and 30 from each other.

Referring to FIG. 2, the plurality of first bonding pads 20 may be arranged to be parallel to each other in the first direction (x-axis direction). Also, the plurality of second bonding pads 30 may be arranged to be parallel to each other in the first direction (x-axis direction). Furthermore, the plurality of extension pads 40 may be arranged to be parallel to each other in the first direction (x-axis direction). Two alignment marks Ak2 may be provided in both ends of the bonding pad unit 310. For example, the two alignment marks Ak2 may be separated from each other with the plurality of first bonding pads 20, the plurality of second bonding pads 30, and the plurality of extension pads 40 arranged to be parallel to each other in the first direction (x-axis direction) therebetween. Also, the two alignment marks Ak2 may be provided on the center line Lc1 parallel to the first direction (x-axis direction) of the bonding pad portion 310.

When seen on a plan view of the printed circuit board 300 (z-axis direction), the plurality of first bonding pads 20 and the plurality of second bonding pads 30 may be alternately arranged with each other in the first direction (x-axis direction). However, since the first bonding pads 20 and the second bonding pads 30 are provided on different layers, a short circuit may not substantially occur between the first bonding pads 20 and the second bonding pads 30.

Meanwhile, the plurality of extension pads 40 may be provided on the first surface 50a of the insulating layer 50. Accordingly, the plurality of first bonding pads 20 and the plurality of extension pads 40 may be provided on the first surface 50a of the insulating layer 50. In particular, the plurality of first bonding pads 20 may be provided on the first region A1 of the first surface 50a of the insulating layer 50, and the plurality of extension pads 40 may be provided on the second region A2 of the first surface 50a of the insulating layer 50. The first region A1 and the second region A2 may be regions separated from each other based on the center line Lc1 parallel to the first direction (x-axis direction) on the first surface 50a of the insulating layer 50. Accordingly, the plurality of first bonding pads 20 and the plurality of extension pads 40 may be separated from each other in the second direction (y-axis direction).

Referring to FIG. 1, the bonding layer 200 may be provided between the plurality of first bonding pads 20 and the electrode pads 10, and between the plurality of extension pads 40 and the electrode pads 10. The bonding layer 200 may have a single layer shape formed to simultaneously contact the plurality of first bonding pads 20 and the plurality of extension pads 40. However, the present example embodiment is not limited thereto, that is, the bonding layer 200 may include a first bonding layer and a second bonding layer separately formed from each other. For example, the first bonding layer may be provided between the plurality of first bonding pads 20 and the plurality of electrode pads 10. In other words, the first bonding layer may be provided only in a region corresponding to the first region A1. Also, the second bonding layer may be provided between the plurality of extension pads 40 and the plurality of electrode pads 10. In other words, the second bonding layer may be provided in a region corresponding to only the second region A2.

Referring to FIG. 1, each of the plurality of extension pads 40 on the first surface 50a may be connected to each of the second bonding pads 30 provided on the second surface 50b through vias 51 included in the insulating layer 50. In other words, the insulating layer 50 may include a plurality of vias 51 that connect the plurality of second bonding pads 30 and the plurality of extension pads 40 in one-to-one correspondence. The plurality of vias 51 may be provided in an edge of the second region A2 of the insulating layer 50. For example, the plurality of vias 51 may be formed in an edge of the insulating layer 50 to be separated from a boundary line where the first area A1 contacts the second area A2 with the plurality of extension pads 40 therebetween. A conductive material 52 may be filled in the plurality of vias 51. For example, the plurality of vias 51 may be filled with copper Cu. However, the present example embodiment is not limited thereto, that is, the plurality of vias 51 may be filled with a conductive material 52 other than copper Cu. A further specific arrangement of the bonding pad unit 310 will be described later with reference to FIG. 3.

Figure 3:
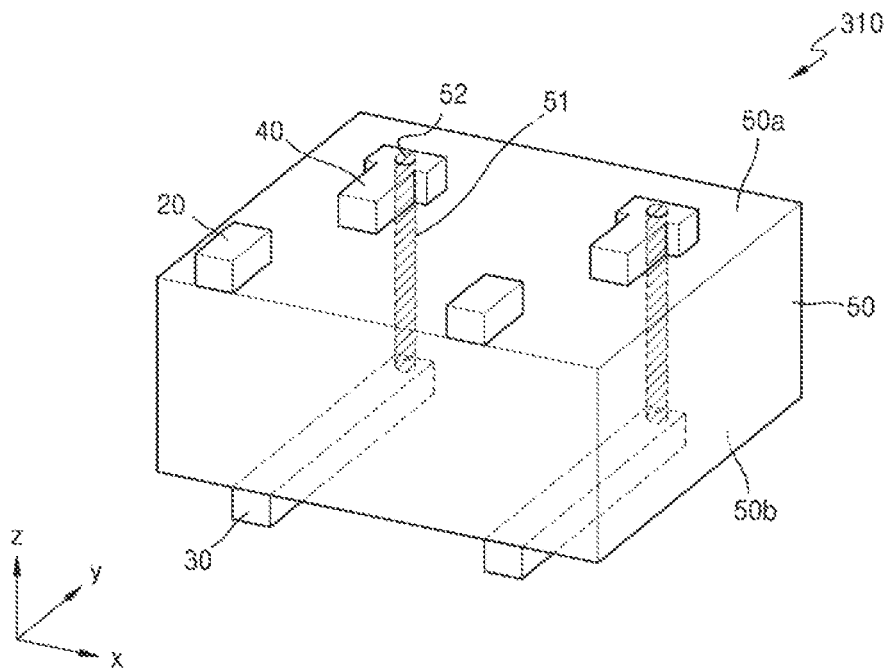
FIG. 3 is a perspective view briefly showing an enlarged area C of FIG. 1.

FIG. 3 is a perspective view briefly showing an enlarged area C of FIG. 1.

Referring to FIG. 3, the bonding pad unit 310 may include a plurality of first bonding pads 20 and a plurality of extension pads 40 provided on the first surface 50a of the insulating layer 50. Also, the bonding pad unit 310 may include a plurality of second bonding pads 30 provided on the second surface 50b of the insulating layer 50.

The plurality of first bonding pads 20 may be arranged to be parallel to each other in the first direction (x-axis direction) at a position corresponding to the first region A1 (refer to FIG. 2) on the first surface 50a of the insulating layer 50. The plurality of second bonding pads 30 may be arranged to be parallel to each other in the first direction (x-axis direction) on the second surface 50b of the insulating layer 50. The plurality of second bonding pads 30 may be formed to be included in both regions corresponding to the first region A1 (refer to FIG. 2) and the second region A2 (refer to FIG. 2). Accordingly, the length of the plurality of second bonding pads 30 in the second direction (y-axis direction) may be greater than that of the plurality of first bonding pads 20 in the second direction (y-axis direction). The plurality of extension pads 40 may be arranged to be parallel to each other in the first direction (x-axis direction) at a position corresponding to the second region A2 (refer to FIG. 2) on the first surface 50a of the insulating layer 50.

As described above, when seen on a plan view of the printed circuit board 300 (z-axis direction), the plurality of first bonding pads 20 and the plurality of second bonding pads 30 may be alternately arranged with each other in the first direction (x-axis direction). Accordingly, the plurality of first bonding pads 20 and the plurality of second bonding pads 30 that are provided on different surfaces of the insulating layer 50 may be arranged in a zigzag shape on a side view in the second direction (y-axis direction) of the insulating layer 50.

The plurality of extension pads 40 may be arranged in one-to-one correspondence to the plurality of second bonding pads 30. For example, when seen on a plan view of the printed circuit board 300 (z-axis direction), the plurality of second bonding pads 30 and the plurality of extension pads 40 may be arranged to overlap each other. In other words, when seen on a plan view of the printed circuit board 300 (z-axis direction), the plurality of second bonding pads 30 and the plurality of extension pads 40 may be located on the same line in the second direction (y-axis direction) crossing the first direction (x-axis direction). Accordingly, the plurality of first bonding pads 20 and the plurality of extension pads 40 may be arranged in a zigzag shape based on the center line Lc1 of FIG. 2. As described above, the plurality of second bonding pads 30 and the plurality of extension pads 40 may be electrically connected to each other through the vias 51 included in the insulating layer 50.

The plurality of first bonding pads 20, the plurality of second bonding pads 30, and the plurality of extension pads 40 may include a conductive material. For example, the plurality of first bonding pads 20, the plurality of second bonding pads 30, and the plurality of extension pads 40 may include copper Cu. However, the present example embodiment is not limited thereto, that is, the plurality of first bonding pads 20, the plurality of second bonding pads 30, and the plurality of extension pads 40 may include a conductive material other than copper Cu. Each of the plurality of first bonding pads 20, the plurality of second bonding pads 30, and the plurality of extension pads 40 may be covered with a conductive coating layer. The conductive coating layer may include, for example, tin Sn. However, the present example embodiment is not limited thereto, that is, the conductive coating layer may include a conductive material other than tin Sn.

Figure 4:
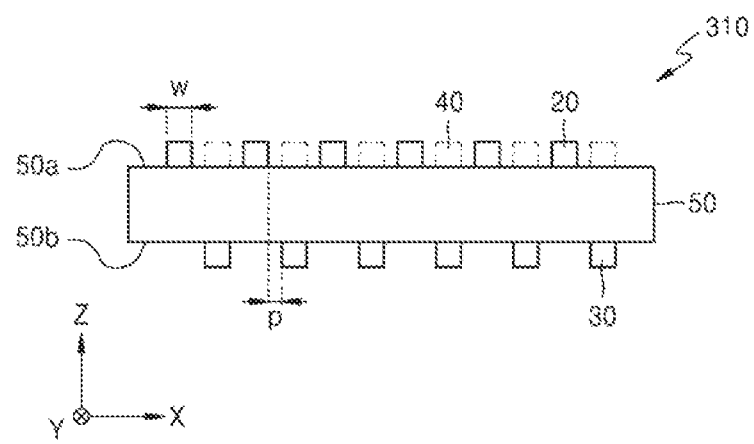
FIG. 4 is a lateral cross-sectional view briefly showing a cross-section taken along the center line Lc1 of FIG. 1.

FIG. 4 is a lateral cross-sectional view briefly showing a cross-section taken along the center line Lc1 of FIG. 2. The plurality of extension pads 40 are illustrated with a dashed line to be easily distinguished from the plurality of first bonding pads 20. For convenience of description, the vias 51 connecting the plurality of second bonding pads 30 and the plurality of extension pads 40 are omitted in FIG. 4.

Referring to FIG. 4, the bonding pad unit 310 may include the plurality of first bonding pads 20 and the plurality of extension pads 40 provided on the first surface 50a of the insulating layer 50. The bonding pad unit 310 may include the plurality of second bonding pads 30 provided on the second surface 50b of the insulating layer 50. The plurality of first bonding pads 20 may have a width W in a range of about 15 µm to about 35 µm. Furthermore, widths W of the plurality of first bonding pads 20, the plurality of second bonding pads 30, and the plurality of extension pads 40 may all be the same. As described above, the first bonding pad 20 and the second bonding pad 30 may be alternately arranged in the first direction (x-axis direction). In this case, a separation distance p between the first bonding pad 20 and the second bonding pad 30 adjacent to each other may be in a range of about 15 µm to about 35 µm.

Figure 5:
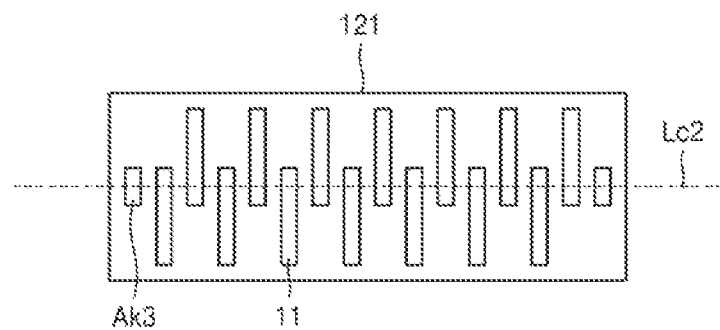
FIG. 5 is a plan view briefly showing an example configuration of an electrode pad unit that may be included in the touch panel of FIG. 1.

FIG. 5 is a plan view briefly illustrating an example configuration of an electrode pad unit 121 that may be included in the touch panel 100 of FIG. 1.

Referring to FIG. 5, the electrode pad part 121 may include a plurality of electrode pads 11. The plurality of electrode pads 11 may be arranged to be parallel to each other in the direction of the center line Lc2 of the electrode pad portion 121. The direction of the center line Lc2 may be a direction to be parallel to the first direction (x-axis direction in FIG. 2). Also, the plurality of electrode pads 11 may be provided on the same plane. For example, the plurality of electrode pads 11 may be provided on the same plane on the substrate sub of FIG. 1. Furthermore, the plurality of electrode pads 11 may be arranged in a zigzag shape based on the center line Lc2 on the surface of the electrode pad unit 121. For example, a part of the plurality of electrode pads 11 may be arranged on a lower side based on the center line Lc2, and another part of the plurality of electrode pads 11 may be arranged on an upper side based on the center line Lc2. Two alignment marks Ak3 may be provided in both ends of the electrode pad unit 121. For example, the two alignment marks Ak3 may be arranged to be separated from each other with the plurality of electrode pads 11 arranged to be parallel to each other in the first direction (x-axis direction in FIG. 2) therebetween. Also, two alignment marks Ak3 may be provided on the center line Lc2 of the electrode pad unit 121.

Figure 6:
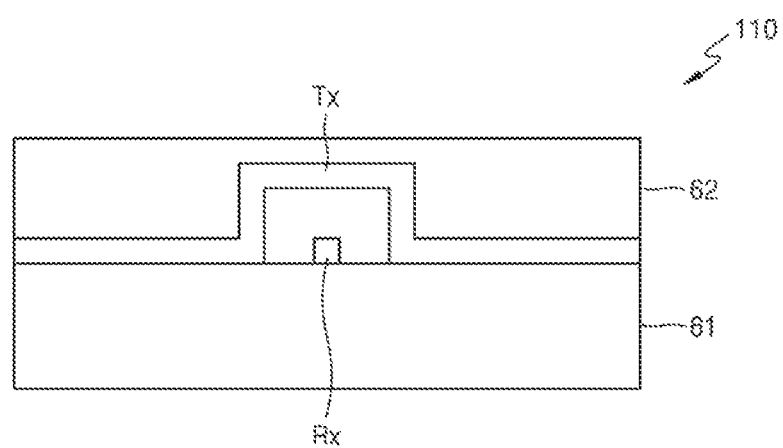
FIG. 6 is a lateral cross-sectional view briefly showing an example configuration of the sensing unit of FIG. 1.

FIG. 6 is a lateral cross-sectional view briefly showing an example configuration of the sensing unit 110 of FIG. 1. For convenience of description, in FIG. 6, it is depicted only a case in which one of the plurality of first electrodes Tx and one of the plurality of second electrodes Rx are crossed. The configuration illustrated in FIG. 6 may be applied to all intersections between the plurality of first electrodes Tx and the plurality of second electrodes Rx.

Referring to FIG. 6, the sensing unit 110 may include a first electrode Tx and a second electrode Rx provided on a substrate 61. The first electrode Tx and the second electrode Rx may be provided on the same plane on the substrate 61. The substrate 61 may be replaced with the substrate sub of FIG. 1. The first electrode Tx may be electrically separated from the second electrode Rx. For example, the first electrode Tx may have a bridge shape at a point where the first electrode Tx and the second electrode Rx cross. The bridge shape may be formed to be separated from the second electrode Rx. As shown in FIG. 6, the bridge shape may include a straight line shape. However, the present example embodiment is not limited thereto, that is, the bridge shape may include a shape bent in a curved shape over the second electrode Rx. Accordingly, the first electrode Tx and the second electrode Rx may be provided on the same plane on the substrate 61 and, at the same time, electrically separated from each other. Furthermore, the sensing unit 110 may further include a protective layer 62 covering the first electrode Tx and the second electrode Rx. The protective layer 62 may prevent the first electrode Tx and the second electrode Rx from being damaged by covering the first electrode Tx and the second electrode Rx.

Figure 7:
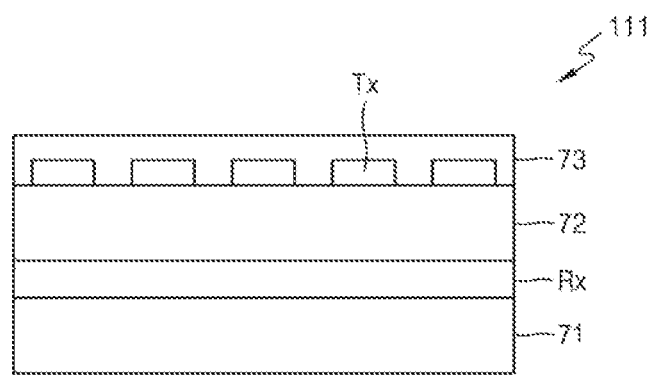
FIG. 7 is a lateral cross-sectional view briefly showing an example configuration of the sensing unit of FIG. 1, according to another example embodiment.

FIG. 7 is a lateral cross-sectional view briefly showing an example configuration of the sensing unit 110 of FIG. 1, according to another example embodiment.

A sensing unit 111 may include a first electrode Tx and a second electrode Rx provided on a substrate 71. The first electrode Tx and the second electrode Rx may be provided on different planes on the substrate 71. For example, the second electrode Rx may be formed by directly contacting a surface of the substrate 71. Furthermore, an insulating layer 72 may be provided on the second electrode Rx. The first electrode Tx may be provided on the insulating layer 72. In other words, the first electrode Tx may be formed by directly contacting a surface of the insulating layer 72. In this way, the first electrode Tx is provided on the insulating layer 72 and the second electrode Rx is provided on a lower surface of the insulating layer 72, and thus, the first electrode Tx and the second electrode Rx are provided on different layers from each other. The sensing unit 111 may further include a protective layer 73 covering the first electrode Tx. The protective layer 73 may prevent the first electrode Tx from being damaged by covering the first electrode Tx.

Figure 8:
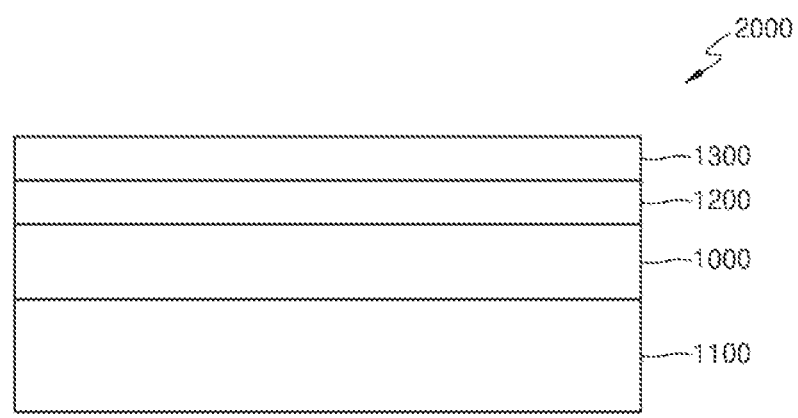
FIG. 8 is a lateral cross-sectional view schematically showing an example configuration of a display device according to an example embodiment.

FIG. 8 is a lateral cross-sectional view schematically showing an example configuration of a display device 2000 according to an example embodiment.

Referring to FIG. 8, the display apparatus 2000 may include a touch sensor 1000 including a touch panel that detects a user's touch and a display panel 1100 that is provided under the touch sensor 1000 to transmit an image. The touch sensor 1000 may be substantially the same as the touch sensor 1000 described with reference to FIGS. 1 to 7.

The display panel 1100 may include any one of a liquid crystal panel and an organic light-emitting diode panel. However, the present example embodiment is not limited thereto, that is, the display panel 1000 may include various types of image generating devices to transmit an image. As depicted in FIG. 8, the display panel 1100 may be provided under the touch sensor 1000. For example, the display panel 1100 may be provided to correspond to a lower side of the sensing unit 110 (refer to FIG. 1) included in the touch sensor 1000. Accordingly, an image from the display panel 1100 may be provided to a user through the transparent substrate sub included in the sensing unit 110.

The display device 2000 may further include a window 1300 on the touch sensor 1000 to protect the touch sensor 1000. The window 1300 may protect the touch sensor 1000 from external impact.

The display device 2000 may further include a polarizing film 1200 provided between the window 1300 and the touch sensor 1000. The polarizing film 1200 may transmit light of an image transmitted from the display panel 1100 and transmitted through the touch sensor 1000 in a certain direction. For example, the polarizing film 1200 may include either a circular polarizing film or a linear polarizing film.

According to the present disclosure, a touch sensor having a structure capable of a large area may be provided.

According to the present disclosure, a touch sensor including a printed circuit board including a bonding pad having a small pitch may be provided.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A touch sensor comprising:
a touch panel comprising a plurality of electrodes and a plurality of electrode pads respectively connected to the plurality of electrodes;
a bonding layer disposed on and in contact with the plurality of electrode pads; and
a printed circuit board comprising:
an insulating layer comprising a first surface adjacent to the bonding layer and a second surface facing the first surface;
a plurality of first bonding pads provided only in a first region of the first surface of the insulating layer;
a plurality of second bonding pads disposed on the second surface of the insulating layer; and
a plurality of extension pads disposed only in a second region different from the first region of the first surface of the insulating layer and respectively connected to the plurality of second bonding pads,
wherein on a plan view of the printed circuit board, the plurality of first bonding pads and the plurality of second bonding pads are alternately arranged in a first direction,
wherein the first region and the second region are separated from each other based on a center line that is parallel to the first direction on a surface of the insulating layer such that the plurality of first bonding pads and the plurality of extension pads are separated from each other in a second direction crossing the first direction,
wherein the insulating layer comprises a plurality of vias that connect the plurality of second bonding pads to the plurality of extension pads via a one-to-one correspondence, the plurality of vias disposed on an edge separated from a boundary line where the first region and the second region contact each other with the plurality of extension pads therebetween,
wherein the first bonding pad and the extension pad contact the other surface facing the surface of the bonding layer contacting the plurality of electrode pads,
wherein the plurality of extension pads extend in the second direction towards the plurality of first bonding pads such that each of the plurality of extension pads has an extended part disposed between each of the plurality of vias and the first region, and a non-extended part connecting to each of the plurality of vias, and
wherein the bonding layer contacts the extended part of each of the plurality of extension pads and does not contact the non-extended part of each of the plurality of extension pads, such that the bonding layer does not cover the plurality of vias.

2. The touch sensor of claim 1, wherein the plurality of first bonding pads and the plurality of extension pads are arranged in a zigzag shape with respect to the center line.

3. The touch sensor of claim 1, wherein on the plan view of the printed circuit board, the plurality of second bonding pads and the plurality of extension pads are located on a same line in a second direction that is perpendicular to the first direction.

4. The touch sensor of claim 1, wherein the plurality of second bonding pads are included in all regions corresponding to the first region and the second region.

5. The touch sensor of claim 1, wherein the plurality of vias are filled with a conductive material.

6. The touch sensor of claim 1, wherein the plurality of electrode pads are disposed on a same plane.

7. The touch sensor of claim 1, wherein the plurality of electrode pads are arranged to be parallel to each other in the first direction.

8. The touch sensor of claim 1, wherein the plurality of electrode pads are arranged in a zigzag shape based on the center line that is parallel to the first direction.

9. The touch sensor of claim 1, wherein on the plan view of the printed circuit board, a separation distance between the first bonding pads and the second bonding pads adjacent to each other is in a range of 15 µm to 35 µm.

10. The touch sensor of claim 1, wherein the bonding layer comprises an anisotropic conductive film layer.

11. The touch sensor of claim 1, wherein the bonding layer comprises a first bonding layer and a second bonding layer that are separated from each other, wherein the first bonding layer is disposed between the plurality of first bonding pads and the plurality of electrode pads, and the second bonding layer is disposed between the plurality of extension pads and the plurality of electrode pads.

12. The touch sensor of claim 1, wherein the printed circuit board comprises either one or both of a chip on film (COF) and a flexible printed circuit board (FPCB).

13. The touch sensor of claim 1, wherein the plurality of electrodes and the plurality of electrode pads are arranged on a substrate including at least one of glass and film.

14. The touch sensor of claim 1, wherein the plurality of electrodes comprises:

a plurality of first electrodes extending in the first direction and arranged to be parallel to each other in the second direction perpendicular to the first direction; and a plurality of second electrodes extending in the second direction to cross the plurality of first electrodes and disposed to be parallel to each other in the first direction.

15. A display device comprising:

the touch sensor of claim 1; and a display panel disposed on a lower side of the touch panel.

\* \* \* \* \*